(12) United States Patent
Cornwall

(10) Patent No.: US 6,336,297 B1
(45) Date of Patent: *Jan. 8, 2002

(54) SELF SEALING FIRESTOP COUPLING ASSEMBLY

(76) Inventor: Kenneth R. Cornwall, 1020 Vintage Club Dr., Duluth, GA (US) 30097

( * ) Notice: Subject to any disclaimer, the term of this patent is extended or adjusted under 35 U.S.C. 154(b) by 0 days.

This patent is subject to a terminal disclaimer.

(21) Appl. No.: 09/369,106

(22) Filed: Aug. 5, 1999

(51) Int. Cl.⁷ .............................................. F16K 17/38
(52) U.S. Cl. ........................ 52/232; 52/220.8; 277/615
(58) Field of Search ............................... 52/220.8, 232, 52/573.1, 1, 302.7; 285/124.2, 124.3, 124.4, 124.5, 192, FOR 118; 277/608, 609, 620, 612, 615, 648

(56) References Cited

U.S. PATENT DOCUMENTS

| | | | |
|---|---|---|---|
| 2,958,822 A | * 10/1960 | Kates | ...................... 285/124.3 |
| 4,086,736 A | 5/1978 | Landrigan | |
| 4,221,092 A | 9/1980 | Johnson | |
| 4,242,164 A | * 12/1980 | Skinner | ................... 277/615 X |
| 4,272,643 A | 6/1981 | Carroll et al. | |
| 4,364,210 A | 12/1982 | Fleming et al. | |
| 4,573,297 A | 3/1986 | Benscoter et al. | |
| 4,619,087 A | 10/1986 | Harbeke | |
| 4,623,170 A | * 11/1986 | Cornwall | ............... 52/220.8 X |
| 4,642,956 A | 2/1987 | Harbeke | |
| 4,646,486 A | 3/1987 | Hauff | |
| 4,669,759 A | 6/1987 | Harbeke | |
| 4,748,787 A | 6/1988 | Harbeke | |
| 4,848,043 A | 7/1989 | Harbeke | |
| 4,882,886 A | 11/1989 | Harbeke | |
| 4,888,925 A | 12/1989 | Harbeke | |
| 4,916,800 A | 4/1990 | Harbeke | |
| 4,918,761 A | 4/1990 | Harbeke | |
| 4,951,442 A | 8/1990 | Harbeke, Jr. | |
| 5,035,097 A | 7/1991 | Cornwall | |
| 5,155,957 A | 10/1992 | Robertson et al. | |
| 5,293,724 A | 3/1994 | Cornwall | |
| 5,309,688 A | 5/1994 | Robertson | |
| 5,347,767 A | 9/1994 | Roth | |
| 5,390,465 A | 2/1995 | Rajecki | |
| 5,417,019 A | 5/1995 | Marshall et al. | |
| 5,452,551 A | 9/1995 | Charland et al. | |
| 5,501,472 A | * 3/1996 | Brancher et al. | ....... 277/615 X |
| 5,634,304 A | 6/1997 | Sakno | |
| 5,649,713 A | * 7/1997 | Ledgerwood | ................ 277/615 |

* cited by examiner

Primary Examiner—Peter M. Cuomo
Assistant Examiner—James O. Hansen
(74) Attorney, Agent, or Firm—Mary M. Moyne; Ian C. McLeod

(57) ABSTRACT

A firestop coupling assembly (10 or 210) for allowing the passage of utility members (50 or 52) through a penetration in a partition (54 or 56) while preventing the transmission of fire and smoke through the penetration. The coupling assembly includes an outer sleeve (12 or 212) and an inner conduit (16 or 216). The outer sleeve has a concentric indention (12D or 212D) around its inner surface within which is mounted an intumescent material (20 or 220). In one (1) embodiment, the inner conduit is mounted in the open top end of the outer sleeve so that the second end (16B or 216B) of the inner conduit is adjacent the intumescent material. In another embodiment, the inner conduit is adjustable along the length of the outer sleeve. A plug (22 or 222) can be provided in at least one end of the inner conduit allowing passage of at least one (1) utility member through the assembly. In another embodiment, the inner diameter of the inner conduit is only slightly greater than the outer diameter of the utility member so that the utility member can be solvent welded to the inner surface of the inner conduit. When the coupling assembly is exposed to heat, the intumescent material expands into the inner passageway of the outer sleeve and prevents the transmission of smoke and fire through the coupling assembly.

12 Claims, 4 Drawing Sheets

SELF SEALING FIRESTOP COUPLING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

(1) Field of the Invention

The present invention relates to a self sealing coupling assembly which allows for the passage of utility members through partitions of a structure such as floors or walls while preventing the transmission of fire and smoke through the coupling assembly. In particular, the present invention relates to a self sealing coupling assembly which includes an intumescent material adjacent one end which expands to fill the inner passageway of the coupling assembly such as to block the inner passageway to prevent the transmission of fire and smoke through the inner passageway of the coupling assembly.

(2) Description of the Related Art

The related art has shown various types of firestop couplings using intumescent material to close the passageway to prevent the transmission of fire and smoke through the passageway. Illustrative are U.S. Pat. Nos. 4,272,643 to Carroll et al; 4,364,210 to Fleming et al; 4,573,297 to Benscoter et al; 5,155,957 to Robertson et al; 5,309,688 to Robertson 5,347,767 to Roth and 5,417,019 to Marshall et al.

Carroll et al shows a fire resistant fitting having plates with a disc of expandable fire resistant material spaced therebetween. The plates and disc have passageways for the conduits.

Fleming et al describes a fire barrier device having a sleeve of intumescent material and an end cap of intumescent material. The sleeve is affixed to the interior of a cylindrical penetration. The end cap is mounted in one end of the cylindrical penetration. The end cap functions to seal the penetration against the passage of flames, smoke and gas. The use of an elastomeric material improves the seal around the conduit or other member passing through the end cap. The cap has a plurality of radial cuts such that the cap is divided into a plurality of segments. The segments are easily displaced to permit the passage of a conduit past the segments wherein the segments can be manipulated into conformance about the cable. Alternatively, the end cap can be custom fitted with a specific diameter aperture or apertures.

Benscoter et al describes a poke-thru floor fitting having a firestop means for sealing the fitting against the passage of fire and smoke through the fitting. The fitting has openings for power conductors and communication conductors.

Robertson et al describes a fire safety device for closing through-holes in floors and walls. The device includes a conduit which is surrounded by a cup-shaped retainer. The retainer is spaced a uniform distance from the outer surface of the conduit to provide a confined space for the intumescent material. The retainer is spaced away from the outside wall of the conduit except at its bottom edge where the retainer conforms to the outside wall of the conduit to prevent leakage of molten intumescent material therebetween. The upper end of the retainer has a plurality of outwardly extending flanges for attaching the retainer to a floor or wall surface. An annular cover disk is attached to the upper end of the retainer to cover the top of the confined space having the intumescent material. The bottom end of the retainer is provided with floating tabs which extend the floor of the retainer inwardly upon destruction of the conduit to prevent the molten intumescent material from falling through the bottom of the retainer cup.

Robertson describes a penetration unit for use in a concrete slab for receiving a service line or pipe. An intumescent material may be provided in the unit to crush the service line or pipe so that heat, smoke, fumes and fire will not pass up through the pipe to the next floor of the building.

Roth describes a fire retardant sleeve assembly having a tubular housing with a collar having intumescent material which is securely held in place by the housing. The assembly allows a user to slide a raceway into and through a ceiling or floor.

Marshall et al describes a coupling device to provide a pass through opening for pipes in the wall of a structure. The coupling device includes an outer housing having an open lower end and a closed upper end with coupling elements extending therebetween. An intumescent material surrounds the coupling elements and fills the space between the coupling elements and the outer housing. The intumescent material locates and positions the coupling elements within the outer housing. The intumescent material is positioned such that the material expands to close off the opening and prevent smoke or fire from traveling through the wall of the structure.

Also of interest are U.S. Pat. Nos. 4,221,092 to Johnson; 4,848,043 to Harbeke; 4,882,886 to Harbeke; 4,888,925 to Harbeke; 4,916,800 to Harbeke; 4,951,442 to Harbeke, Jr.; 5,390,465 to Ralecki and 5,452,551 to Charland et al.

Johnson describes a sleeve which limits the spread of fire through the floors and walls. The sleeve is constructed of an intumescent material having embedded metallic heat conductors to increase heat conductivity through the intumescent material.

Harbeke ('043) describes an under the floor firestop coupling assembly. The coupling assembly includes a tubular-shaped main body with a main body flange to which a firestop metallic band having intumescent material is mounted. The coupling is mounted into a hole in the floor until the main body flange contacts a bottom surface of the floor.

Harbeke ('886) describes a pipe attachment device having an intumescent material cuff.

Harbeke ('800 and '1925) describe pipe coupling assemblies having an intumescent collar mounted around a first end with a metallic band wrapped around the intumescent collar. The metallic band serves to protect and hold the intumescent collar together and provides a heat conductor at the circumferential surface of the intumescent collar.

Harbeke, Jr. ('442) describes a firestop collar for mounting around pipes. The collar has an intumescent material surrounded by a metallic band.

Ralecki describes a device for installation in a building wall or floor to provide a passthrough opening. The device has an open first end and a second end closed by a wall. A ring of intumescent material fills the open first end. The intumescent ring can be provided with a central opening sized to engage with an interference fit, a pipe passing through the device. Alternatively, the ring can support a tube coupling for providing a tubular connection within the device to receive and couple pipes on opposite sides of the wall or floor.

Charland et al describes a firestop assembly having at least two (2) intumescent firestop rings and a restraining collar for use with plastic pipes. The rings are provided in a tiered effect to provide better heat transfer. By providing tiered rings, the rings expand rapidly to close the area between the collapsing pipe and the rings.

Only of minimal interest are U.S. Pat. Nos. 4,086,736 to Landrigan; 4,619,087 to Harbeke; 4,642,956 to Harbeke; 4,646,486 to Hauff; 4,669,759 to Harbeke; 4,748,787 to Harbeke; 4,918,761 to Harbeke; 5,035,097 to Cornwall and 5,634,304 to Sakno.

Landrigan describes a fire and/or liquid seal in a structural wall having a tube-like support extending through the wall with conduits positioned in the support and surrounded by insulation material in the form of silicone foam or packed ceramic fibers.

Harbeke ('087) describes a support apparatus and method for attaching fluid-conveying pipe couplings of various lengths to a metal concrete form which is to be embedded in concrete barriers of various thicknesses.

Harbeke ('956) describes a fire-retardant fluid-coupling for mounting in a concrete floor. The coupling has an intumescent material wrapped about one end with the intumescent material exposed at the bottom side of the concrete floor.

Hauff describes a feedthrough assembly having a passageway for receiving conduits. A lining member in the passageway has at least one elastomeric adaptor which engages the wall surface of the passageway and the outer surface of the conduit. The lining member is formed with a hollow chamber which is filled with a material which reacts endogenetically and emits a fire-inhibiting gas when heated.

Harbeke ('759) describes a fire stack fitting for receiving pipes to be coupled from first and second ends. The fitting has a cavity at one end for holding the intumescent material. The cavity is open to the first side of the wall.

Harbeke ('787) describes a cast-in firestop coupling having an intumescent collar. The intumescent collar has an outer layer of tape which forms a protective and supportive coating for the intumescent material. The intumescent collar is open at the bottom of the coupling to air.

Harbeke ('761) describes a toilet flange mount having an intumescent material collar mounted around the outer surface at the lower end. The intumescent collar includes wraps which are frictionally clamped about the outer surface by a metal strip.

Cornwall describes a coupling to be secured in a hole in a concrete floor or wall. The coupling has elastic rings which hold and locate the pipe in place in the coupling.

Sakno describes a firestop conduit element having the intumescent material contained within an external, moisture impenetrable barrier.

There remains the need for a firestop coupling assembly which is used with one or more utility members having a variety of different diameters where the intumescent material in the outer sleeve of the coupling aassembly expands to crush the utility members or to surround the utility members so as to prevent the transmission of smoke and fire through the utility members or through the coupling assembly around the utility members.

SUMMARY OF THE INVENTION

The present invention relates to a firestop coupling assembly to allow utility members to pass through a partition of a structure and to prevent transmission of fire and smoke through the partition of the structure, which comprises: an outer sleeve having an open first end and an open second end with a sidewall having an outer surface and an inner surface extending therebetween and forming a longitudinal axis; an inner conduit having an open first end and an open second end with a sidewall having an outer surface and an inner surface extending therebetween and forming an inner passageway having a longitudinal axis, wherein the second end of the inner conduit is mounted in the first end of the outer sleeve such that the longitudinal axis of the outer sleeve is co-axial with the longitudinal axis of the inner conduit; an intumescent material mounted in the inner passageway of the outer sleeve adjacent the second end of the outer sleeve wherein when the intumescent material is heated above a predetermined temperature, the intumescent material expands to fill the inner passageway of the outer sleeve; and a plug having at least one opening extending through the plug and mounted in the first end of the inner conduit to close the open first end of the inner conduit such that a longitudinal axis of the opening is parallel to the longitudinal axis of the inner conduit.

Further, the present invention relates to a method for allowing utility members to pass through a floor of a structure while preventing transmission of fire and smoke through the floor of the structure, which comprises the steps of: providing a firestop coupling assembly which includes an outer sleeve having an open first end and an open second end with a sidewall having an outer surface and an inner surface extending therebetween and forming a longitudinal axis; an inner conduit having an open first end and an open second end with a sidewall having an outer surface and an inner surface extending therebetween and forming an inner passageway having a longitudinal axis, wherein the second end of the inner conduit is mounted in the first end of the outer sleeve such that the longitudinal axis of the outer sleeve is co-axial with the longitudinal axis of the inner conduit; an intumescent material mounted in the inner passageway of the outer sleeve adjacent the second end of the outer sleeve wherein when the intumescent material is heated above a predetermined temperature, the intumescent material expands to fill the inner passageway of the outer sleeve; and a plug having at least one opening extending through the plug and mounted in the first end of the inner conduit to close the open first end of the inner conduit such that a longitudinal axis of the opening is parallel to the longitudinal axis of the inner conduit; mounting the coupling assembly in the floor of the structure which includes: (i) securing the outer sleeve of the coupling assembly to a portion of the partition; (ii) providing a cover for the open first end of the inner conduit; (iii) placing the cover on the open first end of the inner conduit; (iv) pouring concrete around the coupling assembly and allowing the concrete to harden to form the floor; and (v) removing the cover and inserting the plug into the first end of the inner conduit wherein when the outer sleeve of the coupling assembly is exposed to heat above a preset temperature, the intumescent material expands to close the inner passageway of the outer sleeve and sealingly expand around the utility members extending through the coupling assembly such that smoke and fire are unable to move past the intumescent material in the inner passageway of the outer sleeve.

The firestop coupling assembly of the present invention allows for the passage of utility members through a penetration in a partition such as a floor, ceiling or wall of a structure while preventing the transmission of fire and smoke through the penetration. The coupling assembly includes an outer sleeve and an inner conduit. The outer sleeve has a concentric indention around its inner surface within which is mounted an intumescent material. In one (1) embodiment, the inner conduit is mounted in the open, top end of the outer sleeve so that the second end of the inner conduit is adjacent the intumescent material. In another embodiment, the inner conduit is adjustable along the length of the outer sleeve. A plug can be provided for in at least one end of the inner conduit. The plug has at least one (1) opening to allow passage of at least one (1) utility member through the assembly. In another embodiment, the inner diameter of the inner conduit is only slightly greater than the outer diameter of the utility member so that the utility member can be secured to the inner surface of the inner conduit. The inner surface of the inner conduit can be tapered toward a center of the inner conduit. This allows the use of a utility member having two pieces which are inserted from the top and bottom of the assembly. In use, the coupling assembly is mounted in a penetration in a floor, wall or ceiling of a structure. The utility members are then passed through the coupling assembly. If several utility members are used or if the outer diameter of the utility member is smaller than the inner diameter of the inner conduit, a plug is first provided in the first or second end of the inner conduit to hold the utility member or members in position. In addition, an initial blank plug having no openings may be inserted into the inner conduit prior to use of the assembly. When utility members are to be passed through the assembly, the blank plug can be replaced with a plug having the correct openings. Alternatively, the opening can be made in the blank plugs. When the coupling assembly is exposed to heat, the intumescent material expands into the inner passageway of the outer sleeve and prevents the transmission of smoke and fire through the assembly.

The substance and advantages of the present invention will become increasingly apparent by reference to the following drawings and the description.

DESCRIPTION OF THE PREFERRED EMBODIMENTS

Figure 1:
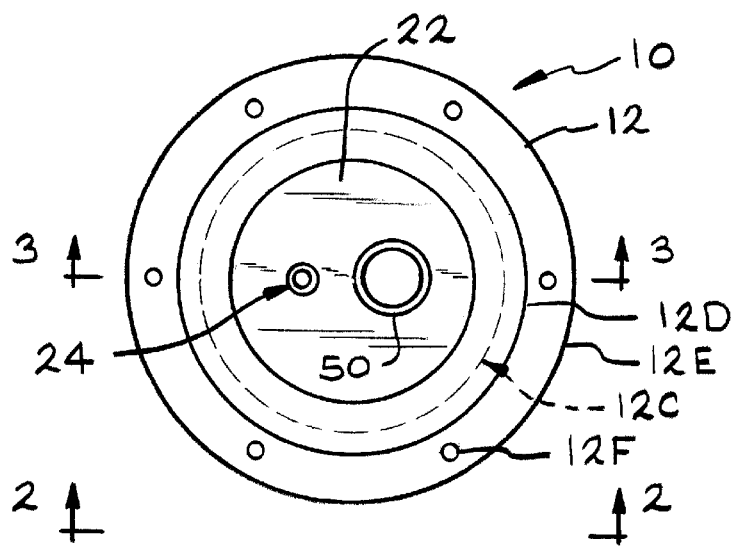
FIG. 1 is a top view of the coupling assembly 10 showing the openings 24 in the plug 22.
Figure 2:
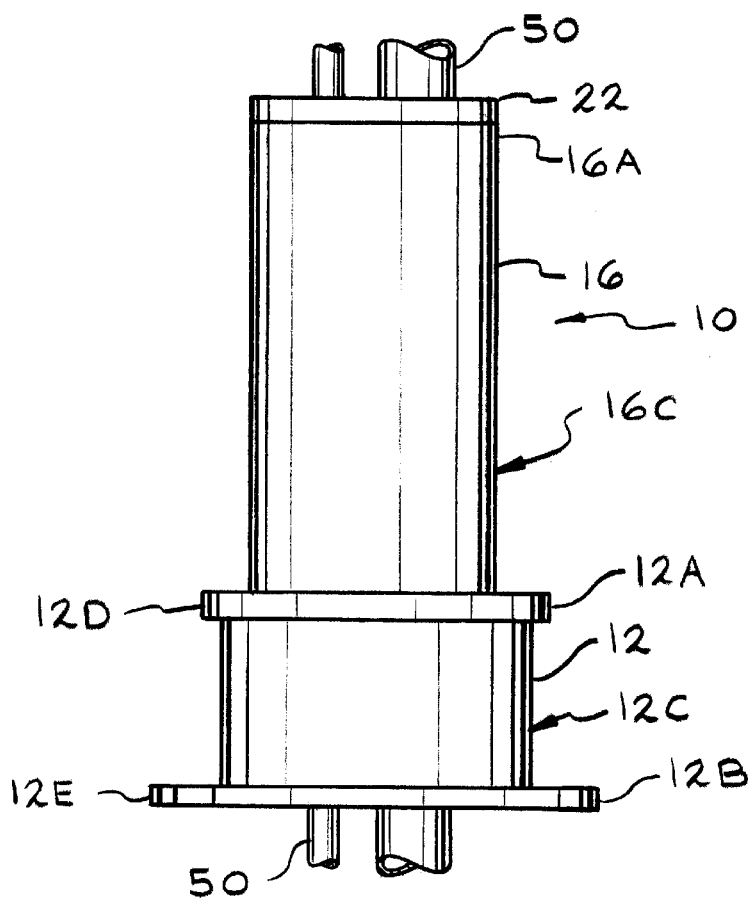
FIG. 2 is a side view along the line 2—2 of FIG. 1 showing the coupling assembly 10.
Figure 5:
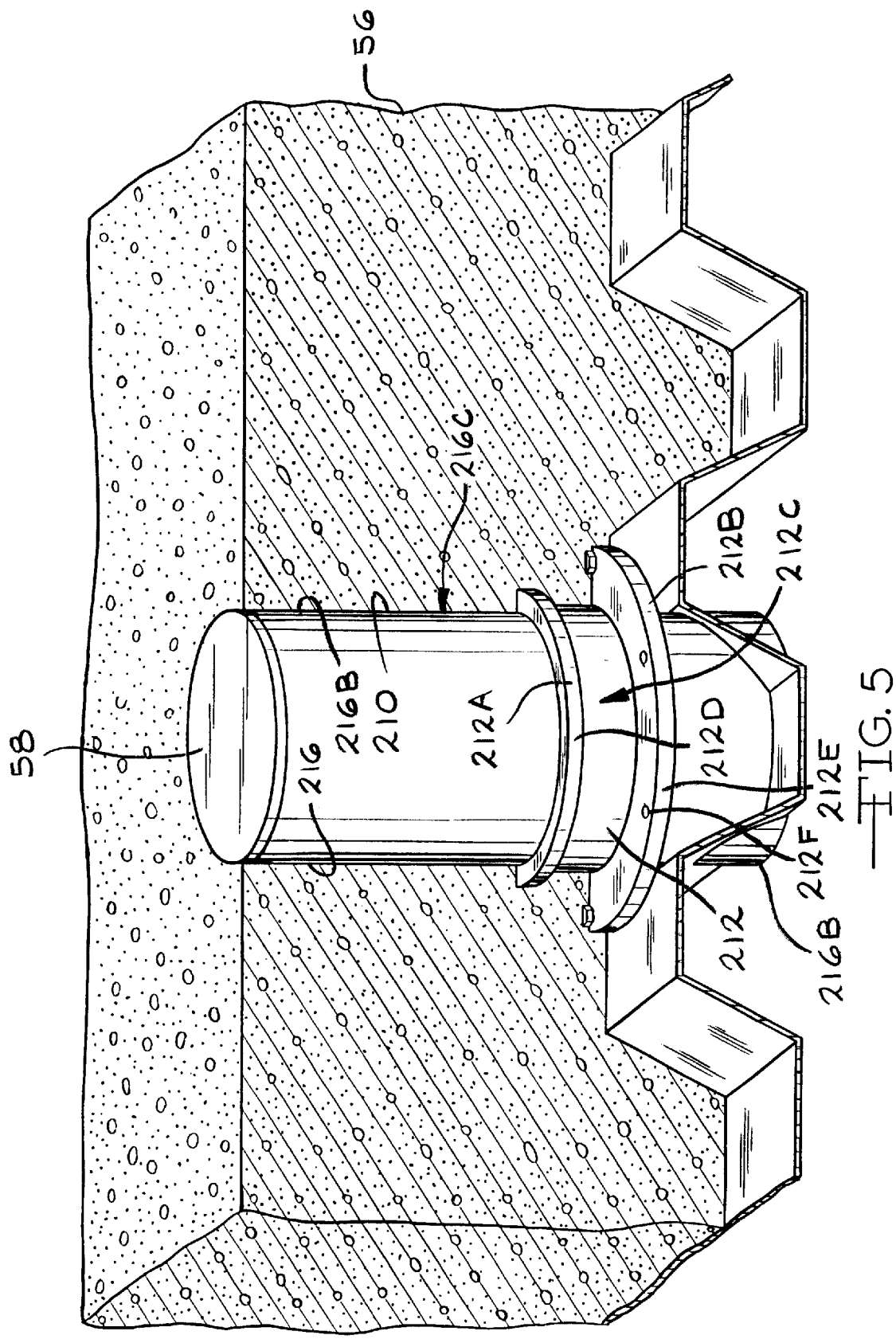
FIG. 5 is a perspective view of a second embodiment of the coupling assembly 210 showing the inner conduit 216 extending completely through the outer sleeve 212.

FIGS. 2 and 5 show the coupling assemblies 10 and 210 of the present invention. Each of the coupling assemblies 10 and 210 includes an outer sleeve 12 and 212 and an inner conduit 16 and 216. The outer sleeve 12 and 212 has an essentially cylindrical shape with an open first end 12A and 212A and an open second end 12B and 212B with a sidewall 12C and 212C extending therebetween forming an inner passageway 14 and 214 along the longitudinal axis A—A and B—B of the coupling assembly 10 and 210. The outer surface of the sidewall 12C and 212C of the outer sleeve 12 and 212 is also provided with a concentric ring 12D and 212D at the first end 12A and 212A and a mounting flange 12E and 212E at the second end 12B and 212B. The mounting flange 12E and 212E is provided with holes 12F and 212F to allow for securing the coupling assembly 10 and 210 to a concrete form (FIG. 1). The inner passageway 14 and 214 of the outer sleeve 12 and 212 has a first portion 14A and 214A adjacent the first end 12A and 212A of the outer sleeve 12 and 212 and a second portion 14B and 214B adjacent the second end 12B and 212B of the outer sleeve 12 and 212.

Figure 3:
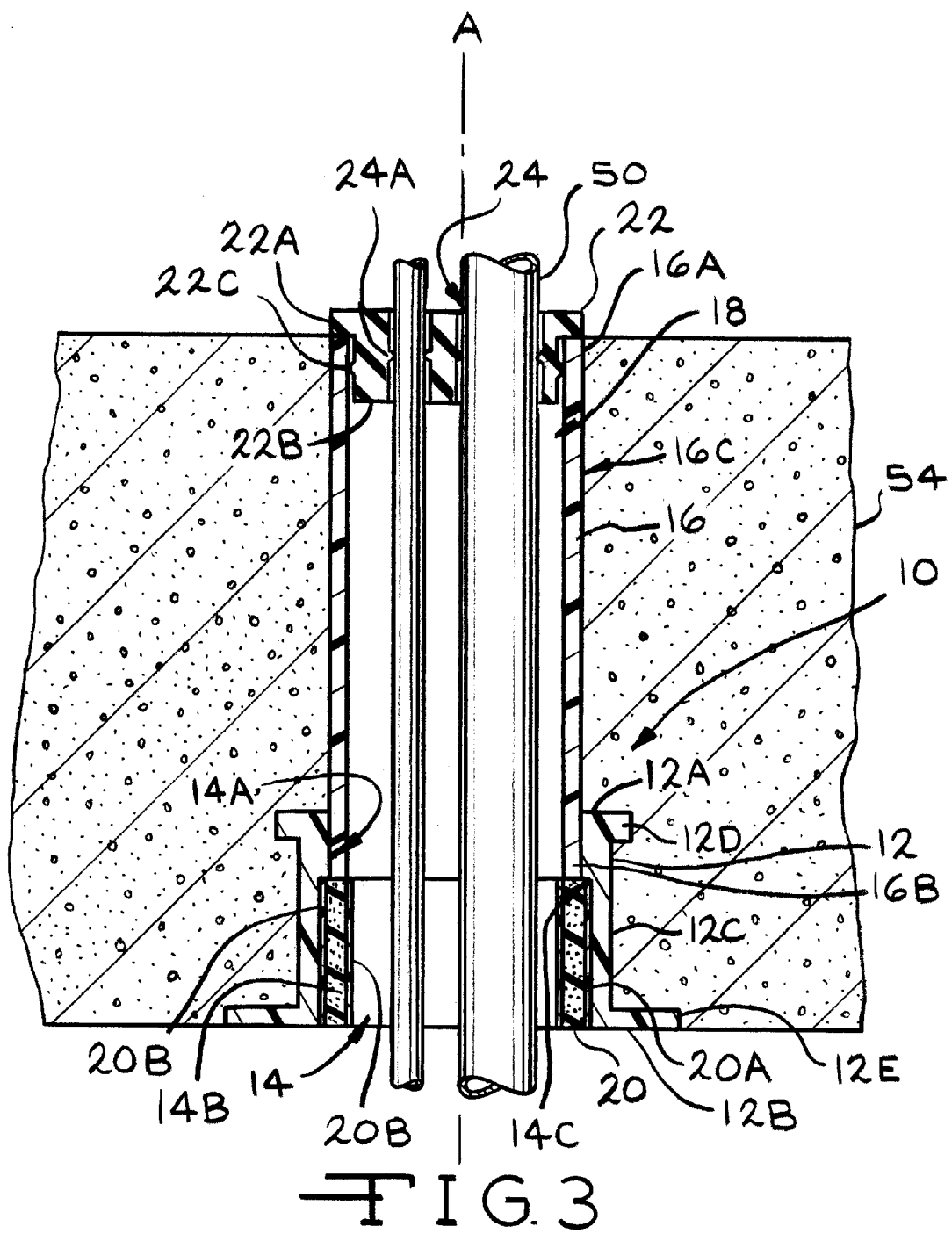
FIG. 3 is a cross-sectional view along the line 3—3 of FIG. 1 showing the utility members 50 extending through the coupling assembly 10.
Figure 6:
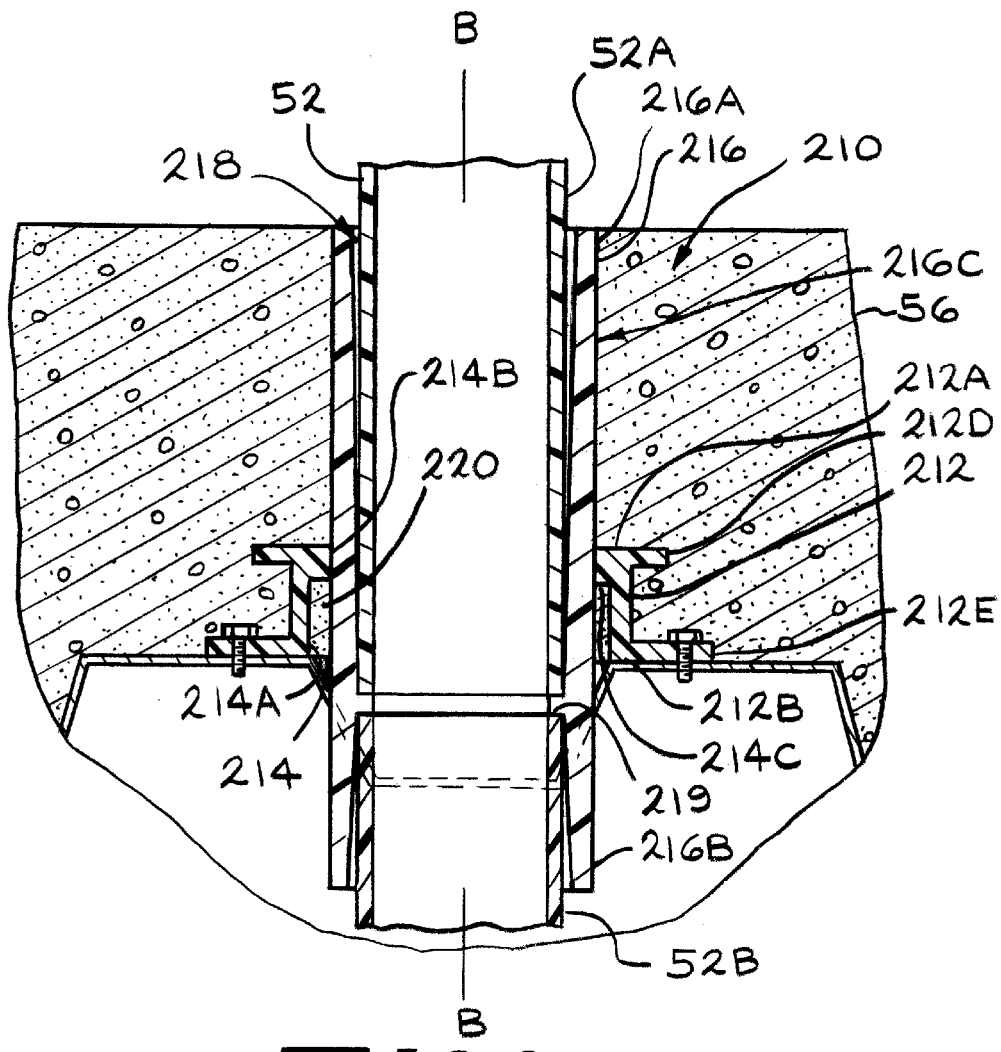
FIG. 6 is a cross-sectional view of the second embodiment showing the inner conduit 216 extending completely through the outer sleeve 212.

In the preferred embodiment, the diameter of the first portion 14A and 214A of the inner passageway 14 and 214 of the outer sleeve 12 and 212 is less than the diameter of the second portion 14B and 214B such that a shoulder 14C and 214C is formed between the first portion 14A and 214A and the second portion 14B and 214B (FIGS. 3 and 6). The diameter of the first portion 14A and 214A is preferably only slightly greater than the outer diameter of the inner conduit 16 or 216. The difference in the diameters of the first and second portions 14A and 214A and 14B and 214B is dependent on the diameter of the first portion 14A and 214A and the diameter of the inner conduit 16 and 216. The greater the diameters of the first portion 14A and 214A and inner conduit 16 and 216, the greater the amount of intumescent material 20 or 220 which is needed to fill the inner passageway 18 and 218. Consequently, the greater the diameter of the first portion 14A and 214A, the greater the difference in the diameters of the first and second portions 14A and 214A and 14B and 214B which allows the second portion 14B and 214B to accommodate a greater amount of intumescent material 20 or 220.

In one (1) version of either embodiment, the outer sleeve 12 and 212 has a length of 2.25 inches (5.72 cm). The first portion 14A and 214A preferably has a length of 0.75 inches (1.91 cm) and the second portion 14B and 214B preferably has a length of 1.50 inches (3.81 cm). The diameters of the first portion 14A and 214B and second portion 14B and 214B of the inner passageway 14 and 214 vary depending on the outer diameter of the inner conduit 16 and 216. Table 1 shows the diameters for the various diameter inner conduits 16 and 216 in inches.

TABLE 1

| Inner conduit | First portion | Second portion |
| --- | --- | --- |
| 2.0" | 2.75" | 3.01" |
| 3.0" | 4.00" | 4.70" |
| 4.0" | 5.00" | 6.18" |

The inner conduit 16 and 216 has a cylindrical shape with an open first end 16A and 216A and an open second end 16B and 216B having a sidewall 16C and 216C therebetween forming the inner passageway 18 and 218 of the inner conduit 16 and 216. In a first embodiment of the coupling assembly 10, the inner conduit 16 is mounted in the outer sleeve 12 such that the second end 16B of the inner conduit 16 extends into the first end 12A of the outer sleeve 12 along only the first portion 14A of the inner passageway 14 of the outer sleeve 12 (FIG. 3). The outer surface of the inner conduit 16 at the second end 16B is secured to the first portion 14A of the inner passageway 14 of the outer sleeve 12. In a second embodiment of the coupling assembly 210, the inner conduit 216 extends completely through the outer sleeve 212 (FIG. 6). The inner conduit 216 is secured along the first portion 214A of the inner passageway 214 of the outer sleeve 212 after the inner conduit 216 is correctly positioned in the outer sleeve 212. The length and positioning of the inner conduit 216 in the outer sleeve 212 is dependent on the type and thickness of the partition 56 in which the coupling assembly 210 is to be mounted. The coupling assembly 210 of the second embodiment is preferably used in a similar context as the coupling assembly described in my U.S. Pat. No. 5,293,724. In both embodiments, the inner conduit 16 and 216 is preferably secured to the inner passageway 14 and 214 of the outer conduit 12 and 212 by any well known means such as solvent welding. Alternatively, the inner conduit 16 and 216 and outer sleeve 12 and 212 can be constructed as a unitary piece.

At least one (1) strip of intumescent material 20 or 220 is mounted in the second portion 14B and 214B of the inner passageway 14 and 214 of the outer sleeve 12 and 212. The intumescent material 20 or 220 preferably extends the entire length of the second portion 14B and 214B. The amount of the intumescent material 20 and 220 which extends into the inner passageway 14 and 214 or the thickness of the intumescent material 20 and 220 is preferably dependent on the positioning of the inner conduit 16 and 216 in the outer sleeve 12 and 212. In the first embodiment, where the inner conduit 16 extends only into the first portion 14A of the inner passageway 14 of the outer sleeve 12, the thickness of the intumescent material 20 is such that the inner diameter of the second portion 14B of the inner passageway 14 with the intumescent material 20 is less than the inner diameter of the first portion 14A and the outer diameter of the inner conduit 16. Preferably, the inner diameter of the second portion 14B of the inner passageway 14 with the intumescent material 20 is essentially equal to the inner diameter of the inner conduit 16. In the second embodiment, where the inner conduit 216 extends completely through the outer sleeve 212, the intumescent material 220 is of a thickness such that the diameter of the first portion 214A and the diameter of the second portion 214B with the intumescent material 220 are essentially the same. The greater the diameter of the inner passageway 214 of the outer sleeve 212, the thicker the intumescent material 220. In both embodiments, the intumescent material 20 or 220 may be constructed of more than one (1) intumescent strips secured to together. The intumescent material 20 or 220 is preferably constructed of an expansion material 20A spaced between two (2) outer coatings 20B. The expansion material 20A is preferably constructed of expandable graphite produced by the chemical or electrolytic treatment of high-grade crystalline flake graphite. The outer coatings 20B are preferably constructed of elastomeric material. In the preferred embodiment, the intumescent material 20 or 220 is similar to intumescent wrap strips manufactured by Zero International located in Bronx, N.Y.

In both embodiments, the inner diameter of the inner conduit 16 and 216 is dependent on the type and number of utility members 50 or 52 to be passed through the coupling assembly 10 and 210. Where there are several utility members 50 or 52, the inner diameter of the inner conduit 16 and 216 is such that the utility members 50 or 52 can be easily inserted through the coupling assembly 10 and 210. In the preferred embodiment, where a single utility member 50 or 52 is passed through the coupling assembly 10 and 210, the diameter of the inner conduit 16 and 216 is only slightly greater than the outer diameter of the utility member 50 or 52 such that the utility member 50 or 52 can be secured to the inner surface of the inner conduit 16 and 216. Alternatively, in the second embodiment, the inner surface of the sidewall 216C of the inner conduit 216 is tapered such that a two (2) piece utility member 52 can be mounted in the coupling assembly 210 (FIG. 6). The inner surface of the sidewall 216C of the inner conduit 216 can also be provided with an inner lip 219. The inner surface of the sidewall 216C is tapered such that the inner diameter of the inner passageway 218 of the inner conduit 216 decreases as it extends from the first and second end 216A and 216B of the inner conduit 216 inward toward the inner lip 219. In the preferred embodiment, the diameter of the passageway 218 of the inner conduit 216 is the same at each end 216A and 216B. Preferably, the diameter of the passageway 218 of the inner conduit 216 adjacent each side of the inner lip 219 is also the same. In one (1) embodiment, the diameter of the passageway 218 adjacent each end 216A and 216B of the inner conduit 216 is 2.390 inches (6.071 cm) and the diameter of the passageway 218 adjacent each side of the inner lip 219 is 2.370 inches (6.020 cm). The tapering of the inner surface of the sidewall 216C of the inner conduit 216 and the inner lip 219 allow the first and second pieces 52A and 52B to be inserted into the first and second end 216A and 216B, respectively of the inner conduit 216 to the correct depth and allows the pieces 52A and 52B to be secured to the inner surface of the inner conduit 216. Preferably, the utility members 52 are secured to the inner conduit 216 by solvent welding. However, it is understood that any other well known method of securing the pieces 52A and 52B to the inner conduit 216 can be used.

A plug 22 and 222 is preferably provided in the open first end 16A and 216A of the inner conduit 16 and 216 of the first embodiment and the open first end and/or second end of the inner conduit in the second embodiment. The plug 22 and 222 acts to hold the utility members 50 or 52 in place in the inner conduit 16 and 216 of the coupling assembly 10 and 210 when there are several utility members 50 or 52 or when there is a single utility member and the outer diameter of a utility member 50 or 52 is less than the diameter of the inner passageway 18 and 218 of the inner conduit 16 and 216 such that the utility member 50 or 52 can not be secured to the inner surface of the inner passageway 18 and 218 of the inner conduit 16 and 216. The plug 22 and 222 preferably has a top portion 22A and 222A and a bottom portion 22B and 222B (FIG. 3). The plug 22 and 222 is mounted in the open first end 16A and 216A or open second end 16B and 216B of the inner conduit 16 and 216 such that the bottom portion 22B and 222B extends into the inner passageway 18 and 218 of the inner conduit 16 and 216. The diameter of the bottom portion 22B and 222B is such that the bottom portion 22B and 222B can be easily inserted into the open first end 16A and 216A of the inner conduit 16 and 216. The outer surface of the bottom portion 22B and 222B of the plug 22 and 222 is preferably provided with at least one (1) rib 22C and 222C. The rib 22C and 222C acts to hold the plug 22 and 222 in place in the open end of the inner conduit 16 and 216. The diameter of the top portion 22A and 222A of the plug 22 and 222 is preferably similar to the outer diameter of the inner conduit 16 and 216. The top portion 22A and 222A prevents the plug 22 and 222 from being completely inserted into the inner passageway 18 and 218 of the inner conduit 16 and 216 and allows for easier removal of the plug 22 and 222. The plug 22 and 222 is preferably constructed of 60 durometer PVC, elastomer.

In the one (1) embodiment, where there are several utility members 50 extended through the coupling assembly 10 or 210, the plug 22 has openings 24 to allow the insertion of the utility members 50 into the coupling assembly 10 or 210 (FIG. 1). The openings 24 are preferably of a diameter only slightly greater than the diameter of the utility members 50. The inner surface of the openings 24 is preferably provided with ribs 24A which help to hold the utility members 50 in position in the plug 22 and in the coupling assembly 10 or 210.

Figure 4:
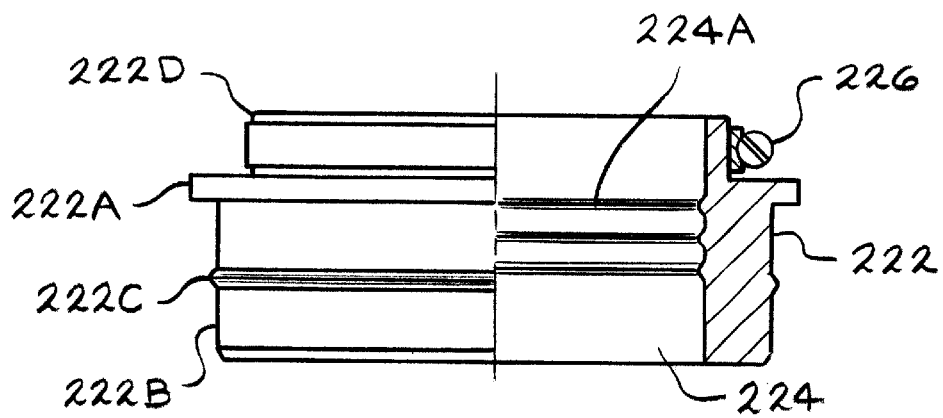
FIG. 4 is a side view of an alternate embodiment of the plug 222 having a partial cross-sectional view showing the ribs 224A on the inner surface of the opening 224 of the plug 222.

In an alternative embodiment, where a single utility member 50 is passed through the coupling assembly 10 or 210, the plug 222 has a single opening 224 (FIG. 4). The plug 222 preferably has an extension 222D surrounding the opening 224 extending upward from the top portion 222A of the plug 222 away from the bottom portion 222B of the plug 222. A clamp 226 is preferably provided around the outer surface of the extension 222D such that the diameter of the opening 224 in the extension 222D can be reduced to grip the utility member 50 and hold the utility member 50 in place.

In Use

The coupling assemblies 10 and 210 of the present invention are used to prevent the transmission of fire and smoke through penetrations in partitions 54 and 56 of structures such as in floors, ceilings and walls while allowing for the passage of utility members 50 or 52 through the partitions 54 and 56. In the first embodiment, the coupling assembly 10 is mounted in the partition 54 such that the first end 16A of the inner conduit 16 is flush with one (1) side of the partition and the open second end 12B of the outer sleeve 12 is flush with the other side of the partition (FIG. 3). In one (1) version of the first embodiment, the coupling assembly 10 is mounted in a concrete floor. To mount the coupling assembly 10 in a concrete floor, the mounting flange 12E of the outer sleeve 12 is secured to a form (not shown) for the concrete floor. Preferably, the inner conduit 16 is secured in the outer sleeve 12 prior to the mounting of the outer sleeve 12 to the form. Next, a cap 58 is placed over the open first end 16A of the inner conduit 16 and concrete is poured around the coupling assembly 10. The cap 58 is removed from the inner conduit 16 after the concrete has formed and the coupling assembly 10 is cast-in-place in the concrete floor. The coupling assembly 210 of the second embodiment is intended to be mounted on a corrugated deck and embedded in a concrete floor (FIG. 6). The mounting of the coupling assembly 210 of the second embodiment is similar to that described in my U.S. Pat. No. 5,293,724.

Once the coupling assembly 10 or 210 is mounted in the partition 54 or 56, the plug or plugs 22 or 222, if used, is placed in the open first end 16A and 216A or open second end 16B and 216B of the inner conduit 16 and 216. Preferably, the plug 22 or 222 is chosen with the specific number and size of openings 24 or 224 needed for each utility member 50. In one (1) embodiment (not shown), an initial blank plug having no opening is inserted into the inner conduit 16 or 216 prior to use of the coupling assembly 10 or 210. When the utility member 50 is to be passed through the coupling assembly 10 or 210, the blank plug is replaced with a plug 22 or 222 having the correct number of openings 24 or 224. In another embodiment (not shown), the openings are made in the blank plug. Once the plug 22 or 222 is in place, the utility members 50 are inserted through the openings 24 or opening 224 in the plug 22 or 222 and extended completely through the coupling assembly 10 or 210. The plug 22 or 222 is positioned such that the openings 24 or opening 224 in the plug 22 or 222 are parallel to the axis A—A or B—B of the coupling assembly 10 or 210. The plug 22 or 222 acts to keep the utility members 50 aligned in the coupling assembly 10 or 210. In the embodiment with multiple openings 24, the diameter of the openings 24 is such that the openings 24 hold the utility members 50 in place and prevent the utility members 50 from falling out or completely going through the coupling assembly 10. The ribs 24A in the openings 24 of the plug 22 form a seal around the utility members 50 to prevent water, smoke and fire from passing through the coupling assembly 10 between the openings 24 and the outer surface of the utility member 50. In the alternate embodiment, where the plug 222 has a single opening 224 and is used with a single utility member 50, the utility member 50 is extended through the opening 224 in the plug 222. The opening 224 can be provided with ribs 224A to hold the utility member 50 in the plug 222 and to form a seal around the utility member 50. Once the utility member 50 is correctly positioned in the coupling assembly 210, the clamp 226 around the extension 222D on the plug 222 is tightened. By tightening the clamp 226, the extension 222D forms a seal around the utility member 50 and acts to hold the utility member 50 in place in the coupling assembly 10 or 210 and to prevent water, smoke and fire from passing through the coupling assembly 10 or 210 between the opening 224 and the outer surface of the utility member 50. The extension 222D and clamp 226 can be used in combination with the ribs 224A on the opening 224 or by themselves. The extension 222D and clamp 226 allow a single plug 222 having a standard size opening 224 to be used with a variety of utility members 50 having different diameters. The plug 22 or 222 on the first or second end 16A or 216A or 16B or 216B of the inner conduit 16 or 216 also helps prevent the spread of smoke and fire through the coupling assembly 10 or 210 by providing a seal in the first end 16A or 216A and/or second end 16B or 216B of the inner conduit 16 or 216. The plug 22 or 222 also acts as a watertight seal to prevent water from leaking through the coupling assembly 10 or 210. The plug 22 or 222 also helps to reduce pipe noise by absorbing sound.vibrations within the pipe. Once assembled and mounted in the partition 54 or 56, the coupling assembly 10 or 210 is used to prevent the transmission of smoke and fire through the penetration while allowing the passage of utility members 50 through the partition 54 or 56.

The coupling assembly 10 or 210 can also be used without a plug 22 or 222 when a single utility member is intended to extend through the coupling assembly 10 or 210. In this embodiment (not shown), the utility member 50 has an outer diameter only slightly less than the inner diameter of the inner conduit 16 or 216. The securing of the utility member 50 to the inner surface of the inner conduit 16 or 216 forms a seal between the inner conduit 16 or 216 and the utility member 50 and prevents fire and smoke from passing through the coupling assembly 10 or 210 around the outside of the utility member 50. In another embodiment, the utility member 52 is constructed of two (2) pieces 52A and 52B (FIG. 6). In the first embodiment, the first piece 52A is inserted into the first end 16A of the inner conduit 16 and the second piece 52B of the utility member 52 is inserted into the second end 12B of the outer sleeve 12. In the second embodiment, the first piece 52A is inserted into the first end 216A of the inner conduit 216 and the second piece 52B is inserted into the second end 216B of the inner conduit 216.

In the second embodiment, the inner surface of the sidewall 216C of the inner conduit 216 is tapered such that the pieces 52A and 52B of utility member 52 are inserted into the coupling assembly 210 to a point where the inner diameter of the inner conduit 216 is less than the outer diameter of the pieces 52A and 52B of the utility member 52. The inner passageway 218 of the inner conduit 216 is also preferably provided with an inner lip 219 such that the ends of the pieces 52A and 52B of the utility member 52 abut against the inner lip 219 when the pieces 52A and 52B are full in place in the inner conduit 216. Both pieces 52A and 52B are preferably secured in the inner conduit 216.

Once installed in the partition 54 or 56, the coupling assembly 10 or 210 acts in response to heat to prevent the passage of fire and smoke through the coupling assembly 10 or 210. In use, when the intumescent material 20 or 220 in the outer sleeve 12 or 212 of the coupling assembly 10 or 210 is heated beyond a preset or predetermined temperature, the intumescent material 20 or 220 expands. In the preferred embodiment, the preset temperature is approximately 250° F. (121° C.). As the intumescent material 20 or 220 expands, the sidewall 12C or 212C of the outer sleeve 12 or 212 prevents the material 20 or 220 from expanding outward and forces the material 20 or 220 to expand inward to close off the inner passageway 14 or 214 of the outer sleeve 12 or 212. The outer sleeve 12 or 212 and the inner conduit 16 or 216 are preferably constructed of a high temperature, fire rated poly vinyl resin such as PVC such that the outer sleeve 12 or 212 and inner conduit 16 or 216 do not melt or collapse when heated beyond the preset temperature. The material used to construct the outer sleeve 12 or 212 and inner conduit 16 or 216 also preferably allows the transfer of heat to the intumescent material 20 or 220 to be greater than if the intumescent material 20 or 220 were encased only in concrete. When heated, the intumescent material 20 or 220 preferably converts into a very bulky material and tends to cling to itself and completely seals off the inner passageway 14 or 214 or the outer sleeve 12 or 212.

In one (1) embodiment, where a single utility member 52 is formed by two (2) pieces 52A and 52B solvent welded in the coupling assembly 10 or 210, the utility member 52 preferably collapses when heated beyond the preset temperature and the intumescent material 20 or 220 expands into the inner passageway 14 or 214 of the outer sleeve 12 or 212 around the collapsed utility member 52.

In another embodiment, where there are several utility members 50 or a single, one (1) piece utility member having a diameter smaller than the diameter of the inner passageway 18 or 218 of the inner conduit 16 or 216, the intumescent material 20 or 220 expands and surrounds the utility members 50 and seals the inner passageway 16 or 216 around the utility members 50.

It is intended that the foregoing description be only illustrative of the present invention and that the present invention be limited only by the hereinafter appended claims.

I claim:

1. A firestop coupling assembly to allow a utility member to pass through a partition of a structure and to prevent transmission of fire and smoke through the partition of the structure, which comprises:

(a) an outer sleeve having an open first end and an open second end with a sidewall having an outer surface and an inner surface extending the rebetween and forming an inner passageway along a longitudinal axis, the inner passageway having a first portion adjacent the first end and a second portion adjacent the second end wherein the outer sleeve is adapted to be mounted completely within the partition of the structure;

(b) an inner conduit having an open first end and an open second end with a sidewall having an outer surface and an inner surface extending therebetween and forming an inner passageway having a longitudinal axis, wherein the inner conduit is a separate piece and is mounted in the first portion of the outer sleeve outer sleeve such as to not extend into the second portion of the inner passageway and such that the longitudinal axis of the outer sleeve is co-axial with the longitudinal axis of the inner conduit wherein the inner passageway of the outer sleeve and the inner passageway of the inner conduit are configured to accommodate the utility member to allow passage of the utility member through one partition;

(c) an intumescent material mounted only in the second portion of the inner passageway of the outer sleeve adjacent the second end of the outer sleeve wherein when the intumescent material is heated above a predetermined temperature, the intumescent material expands to fill the inner passageway of the outer sleeve wherein the outer sleeve and the inner conduit are constructed of a fire rated polyvinyl resin so that the intumescent material can collapse the utility member to prevent the fire and smoke from spreading through the partition; and (d) a polyvinyl resin plug having at least one opening extending through the plug and mounted in the first end of the inner conduit to close the open first end of the inner conduit such that a longitudinal axis of the opening is parallel to the longitudinal axis of the inner conduit.

2. The assembly of claim 1 wherein the plug has an extension on a first surface of the plug extending outward away from the inner conduit, wherein the extension surrounds the opening in the plug and wherein a clamp is provided around the extension to allow a diameter of the extension to be reduced to secure the utility member in the opening of the plug.

3. The assembly of claim 1 wherein the outer sleeve has a flange around the outer surface of the sidewall adjacent the second end to allow for securing the outer sleeve to the partition of the structure.

4. The assembly of claim 1 wherein the outer sleeve has a concentric ring around the outer surface of the sidewall adjacent the first end and is configured to allow for securely mounting the outer sleeve in the partition constructed of concrete.

5. The assembly of claim 1 wherein the plug has a rib around an outer surface such that the rib contacts the inner surface of the sidewall of the inner conduit to secure the plug in the first end of the inner conduit by friction.

6. The assembly of claim 1 wherein an inner surface of the opening of the plug has a rib adapted to hold the utility member in place in the opening.

7. The assembly of claim 1 wherein the first end of the inner conduit extends beyond the first end of the outer sleeve away from the second end of the outer sleeve and wherein the second end of the inner conduit extends beyond the second end of the outer sleeve away from the first end of the outer sleeve.

8. The assembly of claim 1 wherein an inner diameter of the inner conduit reduces in size from the first and second ends toward a middle of the inner conduit to enable the utility member to be secured in the inner conduit adjacent the middle of the inner conduit.

9. A method for allowing a utility member to pass through a floor of a structure while preventing transmission of fire and smoke through the floor of the structure, which comprises the steps of:

(a) providing a firestop coupling assembly which includes an outer sleeve having an open first end and an open second end with a sidewall having an outer surface and an inner surface extending therebetween and forming an inner passageway along a longitudinal axis, the inner passageway having a first portion adjacent the first end and a second portion adjacent the second end wherein the outer sleeve is configured to be mounted completely within the floor of the structure; an inner conduit having an open first end and an open second end with a sidewall having an outer surface and an inner surface extending therebetween and forming an inner passageway having a longitudinal axis, wherein the inner conduit is a separate piece and is mounted in the first portion of the outer sleeve such as to not extend into the second portion of the inner passageway and such that the longitudinal axis of the outer sleeve is co-axial with the longitudinal axis of the inner conduit wherein the inner passageway of the outer sleeve and the inner passageway of the inner conduit accommodate the utility member to allow passage of the utility member through the floor; an intumescent material mounted only in the second portion of the inner passageway of the outer sleeve adjacent the second end of the outer sleeve wherein when the intumescent material is heated above a predetermined temperature, the intumescent material expands to fill the inner passageway of the outer sleeve so that the intumescent material can collapse the utility member to prevent the fire and smoke from spreading through the floor; and a polyvinyl resin plug having at least one opening extending through the plug and mounted in the first end of the inner conduit to close the open first end of the inner conduit such that a longitudinal axis of the opening is parallel to the longitudinal axis of the inner conduit;

(b) mounting the coupling assembly in the floor of the structure which includes:
  (i) securing the outer sleeve of the coupling assembly to a portion of the floor;
  (ii) providing a cap for the open first end of the inner conduit;
  (iii) placing the cap on the open first end of the inner conduit;
  (iv) pouring concrete around the coupling assembly and allowing the concrete to harden to form the floor; and
  (v) removing the cap and inserting the plug into the first end of the inner conduit wherein when the outer sleeve of the coupling assembly is exposed to heat above a preset temperature, the intumescent material expands to close the inner passageway of the outer sleeve and sealingly expand around the utility members extending through the coupling assembly such that smoke and fire are unable to move past the intumescent material in the inner passageway of the outer sleeve.

10. The method of claim 9 wherein the plug has an extension on a first surface of the plug extending outward away from the inner conduit, wherein the extension surrounds the opening in the plug, wherein a clamp is provided around the extension to allow a diameter of the extension to be reduced to secure the utility member in the opening of the plug and wherein after the plug is inserted into the first end of the inner conduit, the utility member is inserted through the opening in the plug and the clamp is tightened to secure the utility member in the opening of the plug.

11. The method of claim 9 wherein the first end of the inner conduit extends beyond the first end of the outer sleeve away from the second end of the outer sleeve and wherein the second end of the inner conduit extends beyond the second end of the outer sleeve away from the first end of the outer sleeve wherein when the outer sleeve and inner conduit are exposed to heat above a preset temperature, the inner conduit collapses and the intumescent material expands against the inner conduit to seal the inner passageway of the outer sleeve such that smoke and fire can not move past the intumescent material in the inner passageway of the outer sleeve and can not move through the inner passageway of the inner conduit.

12. A firestop coupling assembly to allow a utility member to pass through a partition of a structure and to prevent transmission of fire and smoke through the partition of the structure, which comprises:

(a) an outer sleeve having an open first end and an open second end with a sidewall having an outer surface and an inner surface extending therebetween and forming an inner passageway along a longitudinal axis having a first portion adjacent the first end and a second portion adjacent the second end wherein the outer sleeve is configured to be mounted completely within the partition of the structure;

(b) an intumescent material mounted completely within the second portion of the inner passageway of the outer sleeve adjacent the second end of the outer sleeve wherein when the intumescent material is heated above a predetermined temperature, the intumescent material expands to fill the inner passageway of the outer sleeve;

(c) an inner conduit having an open first end and an open second end with a sidewall having an outer surface and an inner surface extending therebetween and forming an inner passageway along a longitudinal axis, wherein the inner conduit is a separate piece and is mounted in the first portion of the inner passageway of the outer sleeve and does not extend into the second portion of the inner passageway of the outer sleeve wherein the longitudinal axis of the outer sleeve is co-axial with the longitudinal axis of the inner conduit, wherein the inner passageway of the outer sleeve and the inner conduit are configured to accommodate the utility member to allow passage of the utility member through the partition and wherein an inner diameter of the inner conduit is essentially equal to an inner diameter of the intumescent material; and (d) a plug constructed of a polyvinyl resin having at least one opening extending through the plug and mounted in the first end of the inner conduit to close the open first end of the inner conduit such that a longitudinal axis of the opening is parallel to the longitudinal axis of the inner conduit.

* * * * *

UNITED STATES PATENT AND TRADEMARK OFFICE
CERTIFICATE OF CORRECTION

PATENT NO. : 6,336,297 B1
DATED : January 8, 2002
INVENTOR(S) : Kenneth R. Cornwall It is certified that error appears in the above-identified patent and that said Letters Patent is hereby corrected as shown below:

<u>Title page,</u>
Under "U.S. PATENT DOCUMENTS", "2,958,822" should be -- 2,956,822 --.

<u>Column 2,</u>
Line 40, "Ralecki" should be -- Rajecki --.
Line 56, "and `1925" should be -- and `925 --.
Line 65, "Ralecki" should be -- Rajecki --.

<u>Column 6,</u>
Line 46, "portion 14A and 214B" should be -- portion 14A and 214A --.

<u>Column 7,</u>
Line 51, "to" before "together" should be deleted

<u>Column 11,</u>
Line 65, "the rebetween" should be -- therebetween --.

<u>Column 12,</u>
Lines 9 and 10, "outer sleeve", second occurrence, it should be deleted.

Signed and Sealed this

Eleventh Day of June, 2002

Attest:

*Attesting Officer*

JAMES E. ROGAN
*Director of the United States Patent and Trademark Office*